Dec. 9, 1969  F. D. E. CORLEY  3,482,915
COLOUR FILM REPRODUCING SYSTEM
Filed March 21, 1967  3 Sheets-Sheet 1

Dec. 9, 1969   F. D. E. CORLEY   3,482,915
COLOUR FILM REPRODUCING SYSTEM
Filed March 21, 1967   3 Sheets-Sheet 2

Dec. 9, 1969   F. D. E. CORLEY   3,482,915
COLOUR FILM REPRODUCING SYSTEM
Filed March 21, 1967   3 Sheets-Sheet 3

United States Patent Office 3,482,915
Patented Dec. 9, 1969

3,482,915
COLOUR FILM REPRODUCING SYSTEM
Ferrand D. E. Corley, 2 Wimbleton Crescent,
Islington, Ontario, Canada
Filed Mar. 21, 1967, Ser. No. 624,893
Int. Cl. G03b 27/54, 27/62, 27/76
U.S. Cl. 355—37                    13 Claims

ABSTRACT OF THE DISCLOSURE

A system and method for reproducing an original film or slide with a controlled modified color appearance. A light beam of controlled color and intensity is projected through an original image carrying member. A reverse image carrying member, with some portions of the image modified, is located in the path of the beam. A second source of light is projected through a third image carrying member which is generally opaque except for areas that correspond to the modified portions of the reverse image carrying member. The two beams of light are combined and projected to a camera.

---

The present invention relates to the reproduction of film or slides and is concerned primarily with an ultimate product that results from an original image, either plain or coloured, with controlled colour effects added.

At the present time it is well known to reproduce plain film or slides. It is equally well known to reproduce coloured film or slides. However there is no known method, system or apparatus for reproducing film or slides with a controlled modified colour effect. If such a product is desired it is necessary to retouch the original or carry out original art work thereon.

Accordingly, the present invention has in view as its foremost objective, the provision of a system and method for reproducing an original film or slide with a controlled modified colour appearance and which is achieved completely without any retouching or original art work.

This end is attained by utilizing a system comprising the following basic components: optical devices for generating a first light source of a required colour and intensity, projecting apparatus receiving the original image and passing the light from the first source therethrough a holder for a second reverse film or slide corresponding to the original but having a portion masked off or displaying an altered portion of the original image, a duplex prism having a reflecting surface which receives the light beam from the second film or slide, a second source of light of a desired colour and intensity and having a third film or slide corresponding to the original but displaying altered portions corresponding to the masked portions of the second film or slide associated therewith so that the light therefrom passes through the other surface of the duplex prism, and a camera receiving the light from the duplex prism.

An important aspect of the present invention is tied in with the optical arrangement of the first light source. Three filters of the primary colours red, blue and green are employed with either a single light source and reflectors or three individual light sources together with dichroic and first surface mirrors to provide a light beam that is the resultant of the coloured light coming from the filters.

This beam is concentrated by a condensing lens and directed onto a reflecting target from which it passes through a condensing lens to the projector. The latter includes a holder for the original film or slide and associated lenses.

Another important phase of the present invention is the combinative relation of the holder for the reverse image, the duplex prism, second light source and optical devices therewith. The reversed film or slide corresponds to the original but a portion thereof is masked or modified. The light from the second source is of a desired colour and intensity and passes through the third slide or film whereupon it is combined with the light from the projector at the duplex prism and delivered to the camera.

An object of the invention is to provide, in a system of the type noted, a camera having a reflex viewer which may be availed of by the operator to determine the character of the light being delivered to the camera.

Still another object is to provide, in a system of the character aforesaid, a camera including a shutter that is operated by a pulse controlled step motor. This ensures an accurate exposure time.

Another object is to provide, in a system of the kind indicated, a camera together with means for adjusting it in three dimensions. This ensures accurate positioning of the camera with respect to the duplex prism.

Various other more detailed objects and advantages of the invention, such as arise in connection with carrying out the above noted ideas in a practical embodiment, will in part become apparent, and in part be hereinafter stated, as the description of the invention proceeds.

For a full and more complete understanding of the invention reference may be had to the following description and accompanying drawings, wherein.

Figure 1:
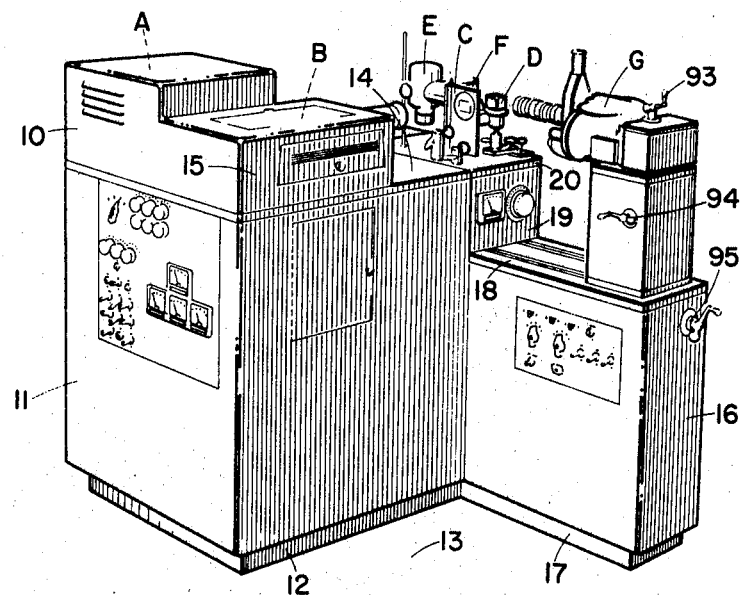
FIGURE 1 is a perspective view of apparatus designed to incorporate the system of the invention and perform the method thereof.

Before referring to the drawings it will be noted that the term "image carrying member" is herein employed to identify a film or slide which displays either the original image or the original image with one or more portions masked or altered as to detail.

Referring now to the drawings the subject system and method will be described by first outlining the general arrangement of the basic components and then setting forth the details of each component so far as they are novel or affect the present invention.

GENERAL ASSEMBLY

Figure 2:
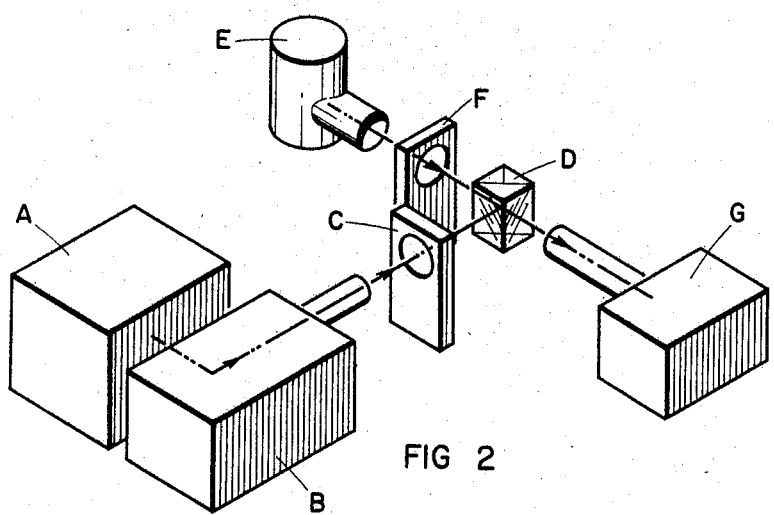
FIGURE 2 is a diagrammatic perspective of the basic elements of the system.

The basic components of the present system are indicated diagrammatically in FIGURE 2. They comprise a first source of coloured light A; a projector B; a holder C for a reverse image carrying member; a duplex prism D; a second source of coloured light E; a holder F for a third image carrying member; and a camera G.

Referring now to FIGURE 1 the various elements making up the light source A are housed in a casing 10 that is mounted on a cabinet 11. The latter has a base 12 that rests on a suitable supporting surface such as floor 13. The cabinet 11 includes a top work table 14 on which the casing 10 rests.

A second casing 15 houses the projector B and is positioned on the work table 14. As illustrated in FIGURE 1 the cabinets 10 and 15 may be combined into a unitary structure. Another cabinet 16 is shown having a base 17 supported from the floor 13 and an upper working surface 18. Supported on the latter is a box 19 having a working table 20 on the same plane as the table 14 with which it aligns.

The holder C is supported from the table 20 as is the duplex prism D, second light source E, holder F and camera G.

The relative position of the components is of importance from the viewpoint of providing a compact, workable arrangement. The light source A and projector B are side by side. The projector B, holder C and mirror D align as do the second light source E, holder F, prism D and camera G, with the latter alignment being normal to that of B, C, and D.

FIRST LIGHT SOURCE

Figures 3, 4:
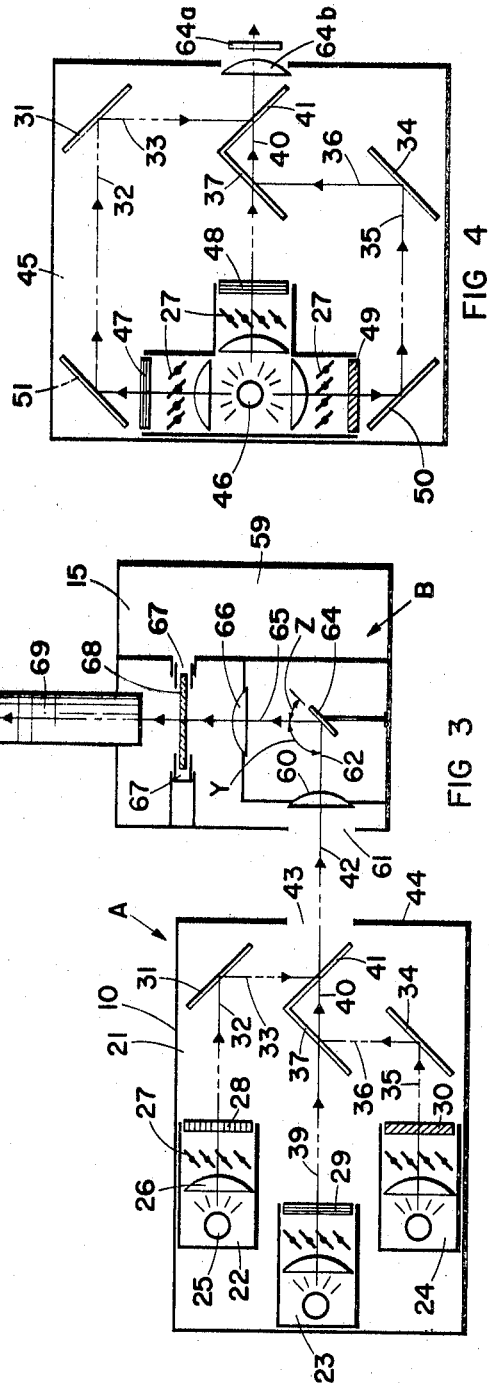
FIGURE 3 is a diagrammatic plan view of the system.
FIGURE 4 is a detailed diagrammatic plan view of a modification of the first light source.

Referring now to FIGURE 3 the several elements of the light source A are shown as mounted on a base 21. They comprise units 22, 23 and 24. These units are, with the exception of the colour of the filter included therein, substantially alike. Thus the unit 22 is shown as made up of a lamp 25, condensing lens 26, shutter 27 and filter 28. For the purposes of this specification the filter 28 is identified as being blue. It will be understood that so far as this invention is concerned all that is required is that there be a filter for each of the primary colours; red, blue and green, irrespective of any particular arrangement.

The unit 23 is the same as unit 22 except that the filter 29 is red. Likewise the unit 24 is the same as units 22 and 23 except that the filter 30 is green.

Mounted on the base 21 in front of the filter 28, and disposed at an angle of 45° relative thereto, is a reflector 31. Light from the filter 28 is represented by the line 32 and reflected light by the line 33. Another reflector 34 is mounted on the base 21 in front of the filter 30 and arranged at an angle of 45° with respect thereto. Light from the filter 30 is represented by the line 35 and reflected light by the line 36.

A dichroic mirror 37 is shown as mounted on base 21 in front of the filter 29 and positioned at an angle of 45° relative thereto. The side of mirror 37 adjacent to filter 29 is the transducing side and light represented by line 39 coming from the filter 29 passes therethrough whence it combines with light 36 reflected from the reflecting side of the dichroic mirror 37. Combined light 36 and 39 is depicted at 40. A second dichroic mirror 41 is arranged normal to the mirror 31 and combined light 40 passes through the transducing side thereof whereupon it is combined with light 33 reflected from mirror 31. The combined unitary light beam is represented at 42 and passes through an aperture 43 formed in a wall 44 of the casing 10.

A modified first light source is shown in FIGURE 4. It is mounted on a base 45 of a shape somewhat different from the base 21 and comprises a single lamp 46 with filters 47, 48 and 49 being arranged therewith in angularly spaced relation. Reflectors 50 and 51 are shown as being disposed opposite to the filters 49 and 47 respectively and at angles of 45° with respect thereto. Shutters 27 are included in the same relation to the filters and the remaining arrangement of reflectors and dichroic mirrors is the same as that illustrated in FIGURE 3 and bear the same reference characters.

Figure 5:
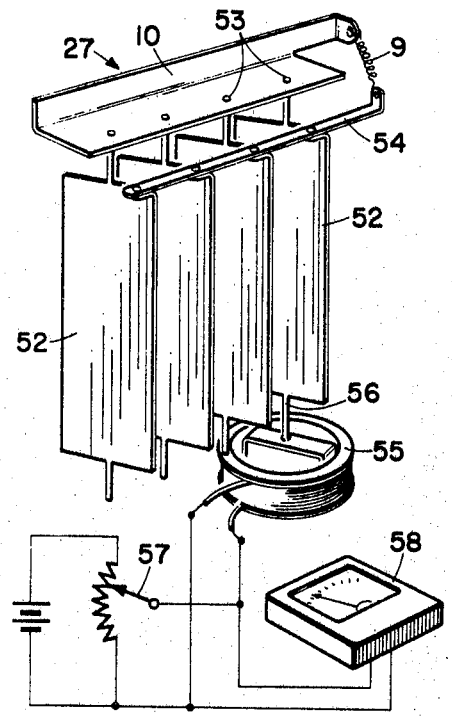
FIGURE 5 is a detailed perspective on an enlarged scale, of a shutter device that may be associated with each filter to adjust the intensity of the light provided thereby.

The function attributed to each of the shutters 27 is to control the intensity of light admitted to the filter, this being determined by the extent to which any shutter is opened. Referring now more particularly to FIGURE 5 one of these shutters 27 is shown as of the Venetian blind type comprising a plurality of vanes 52 each pivotally mounted at 53 and connected to operate in unison by a rod 54. A meter-type motor is shown at 55 and includes a drive shaft 56 which is directly connected to one of the vanes 52 on the axis of its pivotal mounting 53. A spring 9 has one end anchored to the rod 54 and the other to the casing 10.

The motor 55 is of the induction type with the arrow at 57 determining the extent to which the vanes are opened. A meter 58 is connected in parallel with the motor 55 and is located on the wall of the cabinet 11 as shown in FIGURE 1 where it may be viewed by the operator. It will be understood that there is a shutter, motor and meter for each of the filters.

THE PROJECTOR

Referring again to FIGURE 3 the elements of the projector B are shown as mounted on a base 59. They comprise a condensing lens 60 located opposite to an opening 61 formed in a wall of the casing 15 and opposite to the opening 43. Thus the beam 42 passes through the apertures 43 and 61 onto the lens 60. From the latter the concentrated beam represented at 62 engages a target 64. The latter takes the form of reflector of magnesium oxide or comparable material and is arranged at an angle Z of about 45° or more with respect to the beam 65. Larger values for Z are preferred, especially if the angle can be substantially 90°. Such arrangement will require relocation of the unit A of FIGURE 3 so that the unitary light beam 42 makes the smallest possible angle Y with the reflected beam 65 reflected from target 64 through condensing lens 66. The modified first light source before described with reference to FIGURE 4 may embody a modified form of target comprising an opal source plate 64a in the path of a suitable lens 64b axially aligned with ray 40 whereby the ray path 40 may be substituted for ray path 62 of FIGURE 3 and target 64 and light source A thereof, in which event, the opal source plate or source target will be at an angle Z equal to 90°.

A holder for an image carrying member is shown as including structure providing opposed channels 67. An image carrying member 68 may be either a film or slide and is positioned in the channels 67. Adjusting means (not shown) enable flexibility of accurate positioning of member 68 and channels 67.

The projector B includes a conventional assembly of projecting lenses housed within a tube 69. Such projecting lenses are well known and are, therefore, not illustrated.

RECEIVER, DUPLEX PRISM AND SECOND LIGHT SOURCE

The receiver C for the reverse image carrying member is shown as mounted on the table 20. The holder proper comprises a pair of spaced confronting channel members 70 which removably receive a member 71 which may be either a film or slide and which carries an image that is the reverse of the image on member 68. Portions of this image may be masked or have details thereof altered. Between the end of projector tube 69 and member 71 is a lens 72 that may be mounted on and included as a part of the receiver C.

The duplex prism D at 73 consists of two prisms 73a and 73b having an interface 73c which is a 70 percent reflecting mirror surface permitting 30 percent light transmission therethrough defined by a vacuum deposit mirror layer (represented by the numeral 73c defining the interface of 73a–73b and formed by a vacuum deposit technique known to skilled persons in the mirror deposit arts). Prism member 73 is rigidly mounted on table 20. Light beam 62 passes through lens 66, image carrying member 68, projector tube 69, lens 72 and reverse image carrying member 71, whereupon it enters prism element 73b to be reflected by mirror surface 73c located at an angle of 45° with respect to beam 65.

The second light source E is mounted on the table 20 and comprises a lamp 74 disposed within a reflector 75 from which extends a tube 76 which may include one or more lenses. In front of the open end of tube 76 is a light filter 77 which is removably mounted in position. The filter 77 is of a desired colour and on the side thereof opposite to the projector tube 76 a lens 78 is mounted.

The holder F for the third image carrying member takes the form of opposed spaced channel members 79 which removably receive the member 80. Adjusting means (not shown) enable flexibility of accurate positioning of member 80 and channels 79. The image displayed by the latter will ordinarily consist of a transparent portion corresponding to the masked portion of the member 71, or the portion of the latter having modified details, with the remainder of the member 80 opaque.

Light from the lamp 74 takes the form of a beam represented by the line 81. This beam 81 passes through tube 76, filter 77, lens 78 and image carrying member 80 and then onto and through the transducing side of the prism element 73a of duplex prism D, through translucent mirror surface 73c and through prism element 73b in registering coincidence with ray 65 to form resultant ray 82.

THE CAMERA

Figure 6:
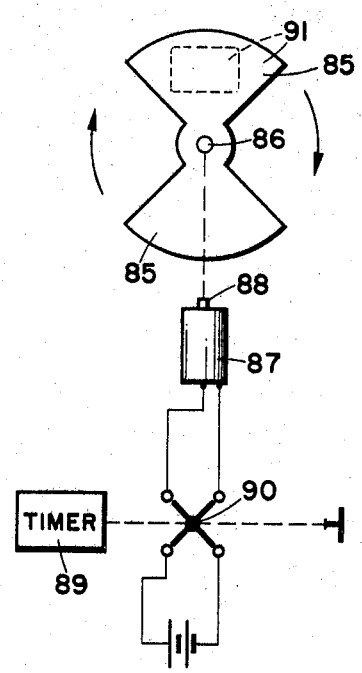
FIGURE 6 is a diagrammatic view of the shutter of the camera and stepper motor for operating the shutter.
Figure 7:
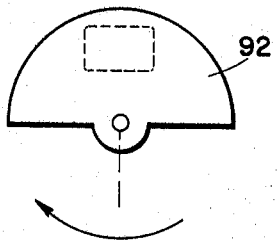
FIGURE 7 is a diagrammatic view of a modified form of shutter.

The camera G is mounted on the table 18. It includes a lens system housed in tube 83 into which the combined beam 82 is introduced. A reflex viewer is represented diagrammatically at 84 and may be availed of by the operator to determine the characteristics of the beam 83. A shutter which does not appear in FIGURE 3 is illustrated on an enlarged scale in FIGURE 6. The shutter is of the butterfly type comprising two sections 85 which are pivotally mounted at 86. A step motor 87 has a drive shaft 88 which communicates by a 1:1 drive connection to shutter supporting drive shaft 86. A timer 89 is connected to switch 90 of the motor.

Step motors of this type are well known and available to the purchasing public as such. Upon being energized the motor 87 moves the vanes 85 through 90°. This exposes the eye 91 for a predetermined interval, say for example, one twentieth of a second, whereupon the vanes 85 move through another 90° to mask the eye 91. Obviously the exposure time may be varied in accordance with known practice.

A modified form of shutter is shown at 92. It is of the half moon type and one cycle of operation requires movement by a 2:1 ratio drive through 360° as compared to the 180° for the butterfly of FIGURE 6.

The remainder of the mechanism of the camera G is of conventional design. As shown in FIGURE 1 three operating members 93, 94 and 95 are provided to adjust the position of the camera G in three dimensions. This is important because it is necessary to bring the camera tube 83 into exact alignment with the beams 82.

OPERATION

While the manner in which the system and method of this invention operates is believed to be obvious from the illustrations of the drawings and description of parts given, one method of operation is hereinafter described. It will be understood that both the system and method are highly flexible and various elements thereof may be omitted and combined in numerous ways to achieve a desired result.

Figure 8:
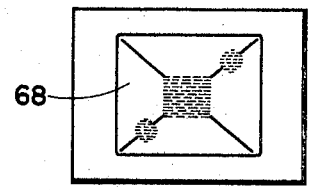
FIGURE 8 is an elevation of a slide carrying the original image.

Let it be assumed that the member 68 is a slide that is plain or of a neutral colour as represented in FIGURE 8 and it is desired to provide a background of a yellow colour and central and corner portions of contrasting colour such as red.

The lamps 25 are energized and the shutters 27 adjusted to provide a required intensity of coloured light coming from each of the filters 28, 29 and 30 so that the resulting beam 42 is exactly of the shade of yellow desired.

Figure 9:
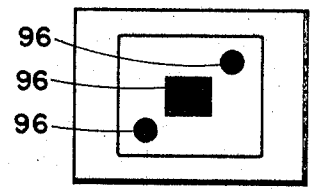
FIGURE 9 is an elevation of a reverse slide with a portion masked.

The beam 42 is condensed by lens 60 and directed onto target 64. It is reflected by the latter and passes through lens 66 and thence through the slide 68. The beam is then projected through lens 72 and slide 71. The latter is a reverse of slide 68 so far as the image is concerned with the exception that central and corner portions thereof are masked, as indicated at 96 in FIGURE 9. The beam then engages the reflecting surface of the duplex prism D.

Figure 10:
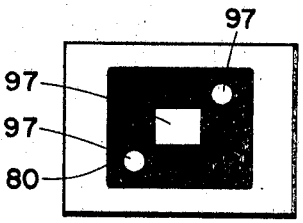
FIGURE 10 is an elevation of a third slide.
Figure 11:
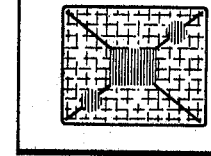
FIGURE 11 is an elevation of the reproduction of the slide of FIGURE 8, modified as to colour and detail in the manner illustrated.

The lamp 74 is also energized and the beam 81 emanating therefrom passes through the filter 77 which is of a red colour of a desired shaft and thence through lens 78 and slide 80. The latter has central and corner portions 97 that are transparent as indicated in FIGURE 10 with the remainder black. The beam 81 now engages the transducing side of the mirror D and passes therethrough whereupon it combines with the beam 65 to form the beam 82 which is the resultant of the two beams.

The beam 82 enters the camera G and the original image is reproduced but modified as to colour background and the colour of the central and corner portions. Thus the background is yellow and the central and corner portions are red.

It will be understood that the projector and camera are preferably automatically linked so that actuation of the camera will effect a projector cycling to the next frame following exposure of one previous frame while also effecting film winding in the camera to the next film position ready for the next exposure. The step motors driving the camera and the projector are operatively related through known electronic timing devices and micro switch mechanism of construction well known in motor drive control applications in other fields. The film holders are adjustable in two directions and as well, may be tilted. The camera also may be tilted as well as adjusted in three axes.

While preferred specific embodiments of the invention are hereinbefore set forth it is to be clearly understood that the invention is not to be limited to the exact mechanisms, devices and steps illustrated and described because various modifications of these details may be provided in putting the invention into practise within the purview of the appended claims.

What I claim as my invention is:

1. In a system for reproducing an image with a controlled colour composition; means for generating a light beam of a required colour and intensity; a projector including a holder for an original image carrying member and optical devices for directing said beam onto and through said image carrying member; a receiver for a reverse image carrying member through which said beam passes from said original image; a duplex prism onto which said beam is directed; a second means for generating a supplemental beam of a required colour and intensity and directing it onto and through said duplex prism where it is combined with said first mentioned beam; and a camera onto which said combined beam is directed.

2. The system of claim 1 together with a holder for a third image carrying member and which holder is interposed between said second light generating means and said dichroic mirror.

3. The system of claim 1 in which the first light generating means comprises a red light filter; a blue light filter; a green light filter, a light source adjacent each of said filters, and reflectors including a dichroic mirror for uniting light from said filters to form said beam.

4. The system of claim 1 in which the first light generating means comprises: a light source, a pair of light filters of two of the primary colours red, blue and green arranged on diametrically opposite sides of said light source with a filter for the remaining colour positioned adjacent to said light source at an angular distance of forty-five degrees from said pair of filters; a pair of dichroic mirrors arranged normal to each other and in alignment with said light source and the last mentioned filter; a reflector for each of said pair of filters arranged in alignment with said light source and the respective filter and on the side of the filter remote from the light source at an angle of forty-five degrees with respect to the filter, a reflector for receiving light from the said first reflectors and directing it onto one of said dichroic mirrors; and another reflector for receiving light from the other of said first mentioned reflectors and directing it onto the other of said dichroic mirrors, whereby all the light from said filters is combined as said beam.

5. The system of claim 1 in which the first light generating means includes a light source; a filter for each of the primary colours red, blue and green arranged to receive light from said source; and shutter means associated with each of said filters for varying the intensity of light coming therefrom.

6. The system of claim 1 in which the projector includes a condensing lens receiving the light beam from the first light generating means; a target source plate disposed at an angle to said beam which is received thereon; and a lens between the receiver and said plate.

7. The system of claim 1 in which the camera includes a reflex viewer for determining the characteristics of the light beam being introduced into the camera.

8. The system of claim 1 in which the camera includes a shutter, and a step motor drive for operating the shutter.

9. The system of claim 1 together with means for adjusting the position of the camera in three dimensions and tilting same.

10. In the reproduction of an image with a controlled colour composition; the method comprising the steps of: generating light; creating primary colours from said light by filtering; combining filtered light to form a light beam that is the resultant of said filtered light; passing said beam through an image carrying member and projecting it onto a reverse image carrying member having a portion masked or altered; generating a second light, filtering said second light to form a second coloured light beam, combining said beams; and creating a photograph from said combined beams.

11. The method of claim 10 together with the step of passing said second light beam through a third image carrying member before it is combined with said first mentioned beam.

12. The method of claim 10 together with the steps of adjusting the intensity of the primary coloured lights before they are combined into said beam.

13. The method of claim 10 together with the step of scanning the combined beam prior to the creation of the photograph to determine the characteristics thereof.

References Cited

UNITED STATES PATENTS 2,909,097  10/1959  Alden et al. _____ 353—31

NORTON ANSHER, Primary Examiner

W. A. SIVERTSON, Assistant Examiner

U.S. Cl. X.R.

355—70, 75